United States Patent [19]

Kissinger

[11] Patent Number: 5,225,518
[45] Date of Patent: Jul. 6, 1993

[54] POLYCARBONATE PREPARATION FROM MOLTEN BISPHENOL-A/WATER MIXTURE

[75] Inventor: Gaylord M. Kissinger, Evansville, Ind.

[73] Assignee: General Electric Company, Pittsfield, Mass.

[21] Appl. No.: 826,319

[22] Filed: Jan. 21, 1992

[51] Int. Cl.$^5$ ............................................. C08G 64/20
[52] U.S. Cl. ................................ 528/196; 528/176; 528/179; 528/182; 528/198; 528/199; 528/371

[58] Field of Search ............... 528/196, 198, 199, 371, 528/179, 176, 182

[56] References Cited

U.S. PATENT DOCUMENTS 4,810,813  3/1989  Kosky et al. ...................... 528/196

Primary Examiner—Harold D. Anderson

[57] ABSTRACT

In the interfacial polymerization process for preparing aromatic carbonate polymers by reacting bisphenol-A with a carbonate precursor, the bisphenol-A is introduced to the reaction medium in a liquid form saturated with water.

3 Claims, No Drawings

POLYCARBONATE PREPARATION FROM MOLTEN BISPHENOL-A/WATER MIXTURE

BACKGROUND OF THE INVENTION

Field of The Invention

The invention relates to methods of preparing aromatic carbonate polymer resins.

Brief Description of the Related Art

Aromatic carbonate polymers are the polymerization products of a dihydric phenol and a carbonate precursor such as a carbonyl halide. These polycarbonates and their preparation are known in the art and are described, for example, in U.S. Pat. Nos. 3,028,365; 3,334,154; 3,275,601 and 3,915,926, all of which are incorporated herein by reference thereto.

The present invention is an improvement in the process of polymerization (interfacial), facilitating handling of certain reagents and conserving energy.

SUMMARY OF THE INVENTION

The invention comprises, in the interfacial polymerization of bisphenol-A with a carbonate precursor to obtain an aromatic carbonate polymer, the improvement, which comprises adding the bisphenol-A to the reaction mixture in the form of a liquid saturated with water.

DETAILED DESCRIPTION OF THE PREFERRED EMBODIMENTS OF THE INVENTION

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing flakes, crystals or prills of the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quarternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed to prepare aromatic carbonate polymers are known. The commercially valuable dihydric phenol frequently employed is 2,2-bis(p-hydroxyphenyl) propane (commonly referred to as "bisphenol-A").

The carbonate precursor can be either a carbonyl halide, a diarylcarbonate or a bishaloformate. The carbonyl halides include carbonyl bromide, carbonyl chloride, and mixtures thereof. The bishaloformates suitable for use include the bishaloformates of dihydric phenols such as bischloroformates of 2,2-bis (4-hydroxyphenyl)-propane, 2,2-bis(4-hydroxy-3,5-dichlorophenyl) propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are preparation of the high molecular weight thermoplastic randomly branched polycarbonates. These randomly branched polycarbonates are prepared by coreacting a polyfunctional organic compound with the aforedescribed dihydric phenol and carbonate precursor. Some of the polyfunctional organic compounds useful in making the branched polycarbonates are set forth in U.S. Pat. Nos. 3,635,895 and 4,001,184, which are incorporated herein by reference. These polyfunctional compounds are generally aromatic and generally contain at least three functional groups which are carboxyl, hydroxyl, carboxylic anhydride, haloformyl or mixtures thereof. Some nonlimiting examples of these polyfunctional aromatic compounds include trimellitic anhydride, trimellitic acid, trimellityl trichloride, 4-chlorformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, 1,1,1,-tris(4-hydroxyphenyl)ethane and the like. The preferred polyfunctional aromatic compounds are trimellitic anhydride or trimellitic acid or their haloformyl derivatives or the trisphenols. Also included herein are blends of a linear polycarbonate and a branched polycarbonate.

The term "polycarbonate" as used herein is inclusive of copolyester-polycarbonates, i.e.; resins which contain, in addition to recurring polycarbonate chain units of the formula:

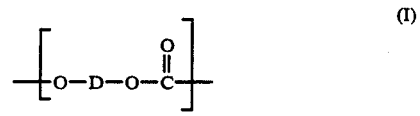

(I)

wherein D is a divalent aromatic radical of the bisphenol-A employed in the polymerization reaction, repeating or recurring carboxylate units, for example of the formula:

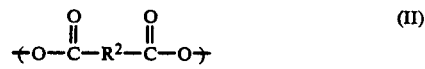

(II)

wherein $R^2$ is as defined below.

The copolyester-carbonate resins are also prepared by interfacial polymerization technique, well known to those skilled in the art; see for example the U.S. Pat. Nos. 3,169,121 and 4,487,896, which are incorporated herein by reference thereto.

In general the copolyester-carbonate resins are prepared as described above for the preparation of polycarbonate homopolymers, but by added presence of a difunctional carboxylic acid (ester precursor) in the water immiscible solvent.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

$$R^1 \text{—} (R^2)_q \text{—} COOH \qquad (III)$$

wherein $R^2$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents one where $R^1$ is a hydroxyl group and either zero or one where $R^1$ is a carboxyl group.

Preferred difunctional carboxylic acids employed are the aromatic dicarboxylic acids. Particularly useful aromatic dicarboxylic acids are those represented by the general formula:

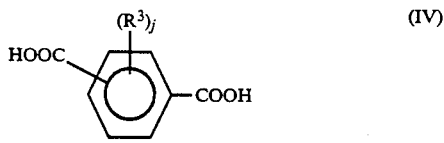

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenol, p-cumylphenol, isooctylphenol and the like. Techniques for the control of molecular weight are well known in the art and are used for controlling the molecular weight of the resins prepared by the improved process of the present invention.

The method for preparing the aromatic carbonate polymers when employing phosgene, involves passing phosgene into the reaction mixture containing the dihydric phenol and an acid acceptor. A suitable acid acceptor may be either organic or inorganic in nature. Representative of an organic acid acceptor is a tertiary amine such as pyridine, triethylamine, dimethylaniline, tributylamine and the like. The inorganic acid acceptor may be one which can be either a hydroxide, a carbonate, a bicarbonate, or a phosphate or an alkali or alkaline earth metal hydroxide. The amount of the phosgene required will generally depend upon the amount of the dihydric phenol present. Generally speaking, one mole of phosgene will react with one mole of the dihydric phenol to provide the polymer and two moles of HCl. Two moles of HCl are in turn "attached" by the acid acceptor present. The foregoing are herein referred to as stoichiometric or theoretical amounts.

The process of the present invention starts with provision of a liquid form of the bisphenol-A, saturated with water, for addition to the otherwise conventional reactants and reaction medium for the interfacial polymerization reaction. Bisphenol-A in relatively pure form occurs as crystals or flakes with a melting point (solidification range) of from about 150° to 155° C. The solid is practically insoluble in water.

However, in the presence of at least an equimolar proportion of water (7.3 percent by weight) the melting point of bisphenol-A is lowered to about 96° C. At this temperature, the bisphenol-A forms an "oil" which is heavier than and also immiscible with water. A separate layer does not form in the mixture however, until the water saturation level is exceeded.

Advantageously, the amount of water included in the mixture with the "oil" or melted bisphenol-A is within the range of from about 20 percent by weight to 40 percent by weight of the total mixture. This range represents about 17 to about 45 percent of the water conventionally present in the inter-facial polymerization procedure. Accordingly, the water contributed by the admixture with the bisphenol-A can be accounted for as a part of the total water normally present in the phosgenation. The bisphenol-A/water "oil" can be maintained at a temperature of circa 98° C. under atmospheric pressures (preferably at an elevated pressure of circa 1 to 10 PSIG).

The improved process of the present invention may be carried out by adding the bisphenol-A/water mixture (at a temperature of circa 98° C. to 105° C.) preferably under a slight pressure as aforementioned to a methylene chloride/water immiscible solvent mixture, with stirring. Crystallization of the bisphenol-A in this mixed solvent medium results in a mix of needle and orthorhombic crystal forms, ranging in size from about 50-350 microns in length, with an aspect ratio of 7-10 for the needles, and 1-2 for the orthorhombic crystals. The smaller size and larger surface area of these crystals improves the dissolution time and therefore the reaction kinetics over bisphenol-A flakes. After admixture of the liquid form of the bisphenol-A with the reaction medium, phosgenation under normal conditions practiced in the prior art processes may be carried out. Furthermore, this method of feeding BPA can be used in a continuous reaction procedure.

The following example and preparations describe the manner and process of carrying out the invention and set forth the best mode contemplated.

EXAMPLE 1

200 lb. of bisphenol-A (BPA) was added along with 10.5 gal water (30.3% $H_2O$/69.7% BPA) to a BPA/water melter. The BPA/water mixture temperature was raised to 220° F., with an $N_2$ blanket on the melter of 5 psig, and the mix circulated in a "pump-around loop" of the melter. Forming this BPA/water mix may be carried out continuously by mixing molten BPA at approximately 350° F., with water at 185° F., in a mixing tee, under a back-pressure of 10-15 psig.

Separately, 52 gal. of methylene chloride was added to a formulation vessel along with 15 gal. water. The BPA/water "oil" mix was then added from the circulating melter vessel into the $CH_2Cl_2$/water mix, which was continually stirred in the formulation vessel. The addition was carried out over about a 10 minute period, with the temperature in the formulation vessel rising to 104° F., while refluxing the $CH_2Cl_2$/water on a reflux condenser. From this addition step was formed the crystalline BPA primarily in needle (dendritic) crystal form, with lesser amounts of orthorhombic crystals.

10 gal. of water was then charged along with 15 gal. of methylene chloride, 15.5 lb of an amine catalyst and 3.6 lb chain stopper (phenol) to a phosgene reactor. The mixture containing mixed crystals stirring in water/$CH_2Cl_2$ mixed solvent, was then pumped into the charged phosgene reactor.

With all the described components now in the phosgene reactor, 115 lb phosgene was added over approximately 28 minutes, with 15.5 gal of 50% aqueous caustic (NaOH) being added during the same time frame to control the pH of the reaction, ending the reaction at a pH between 7-9.

The average values for the polymer obtained from the phosgenation were in the range expected. They are as follows:

| Intrinsic Viscosity (di/gm) | Di-aryl Carbonates (PPM) | Weight Average | | MW/MN Ratio |
|---|---|---|---|---|
| | | Molecular Weight | Molecular Number | |
| 0.438 | 159 | 24,640 | 10,918 | 2.26 |

The method of formulating the molten BPA/Water mix can be done either in a separate formulation vessel, followed by phosgenation in a reactor vessel, or, the formulation and phosgenation can be carried out, in the same reactor.

What is claimed is:

1. In the interfacial polymerization of bisphenol-A with a carbonate precursor in a reaction mixture which comprises bisphenol-A, a carbonyl halide, water, a water-immiscible solvent, and a catalyst, to obtain an aromatic carbonate polymer, the improvement which comprises; adding the bisphenol-A to the reaction mixture in the form of molten bisphenol-A mixed with water.

2. The polymerization in accordance with claim 1 wherein the water mixed with said molten bisphenol-A is from about 20 to 40 weight percent of the water and bisphenol-A mixture.

3. The polymerization in accordance with claim 1 wherein the molten bisphenol-A is saturated with water.

* * * * *